March 12, 1935.  J. F. O'CONNOR  1,993,977
HAND BRAKE
Filed May 12, 1933  2 Sheets-Sheet 1
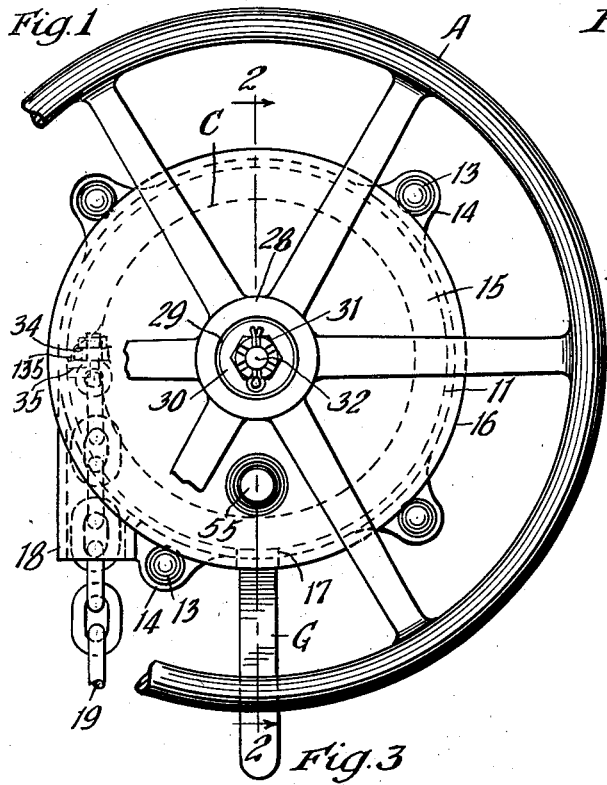
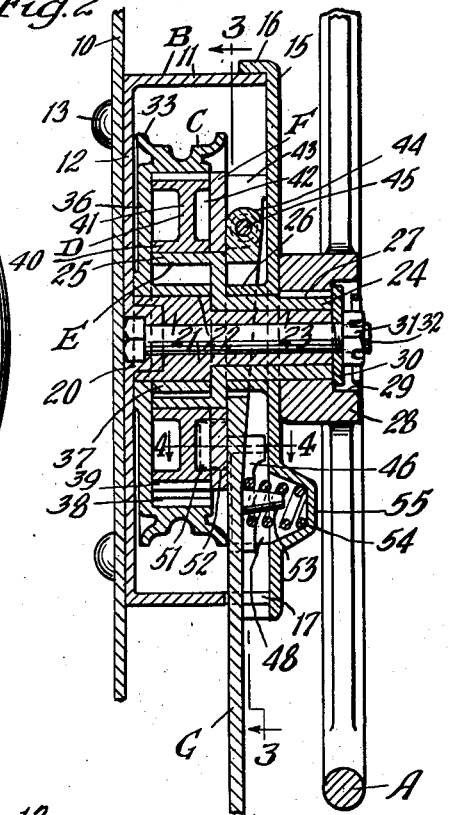
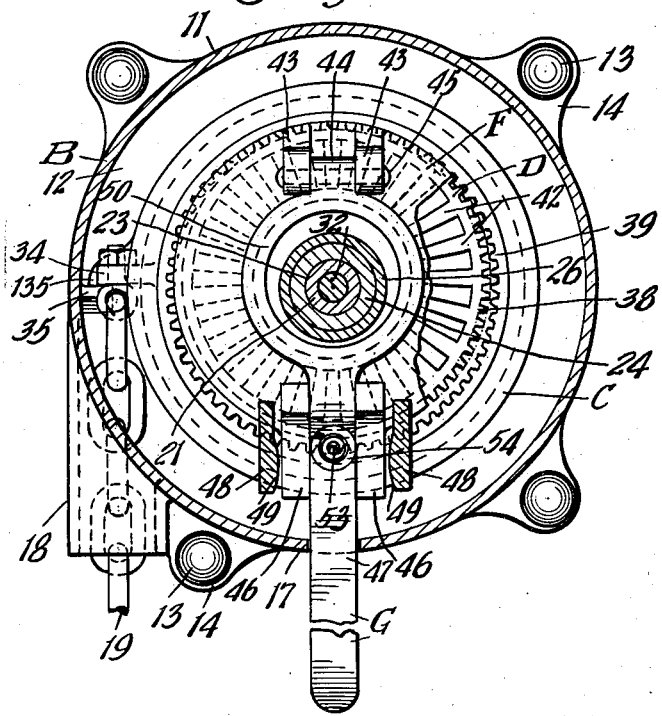
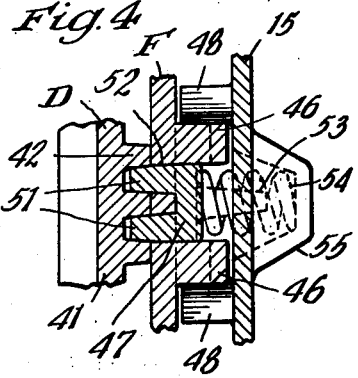
Inventor
John F. O'Connor
By Joseph Harris
His Atty.

March 12, 1935.　　J. F. O'CONNOR　　1,993,977
HAND BRAKE
Filed May 12, 1933　　2 Sheets-Sheet 2
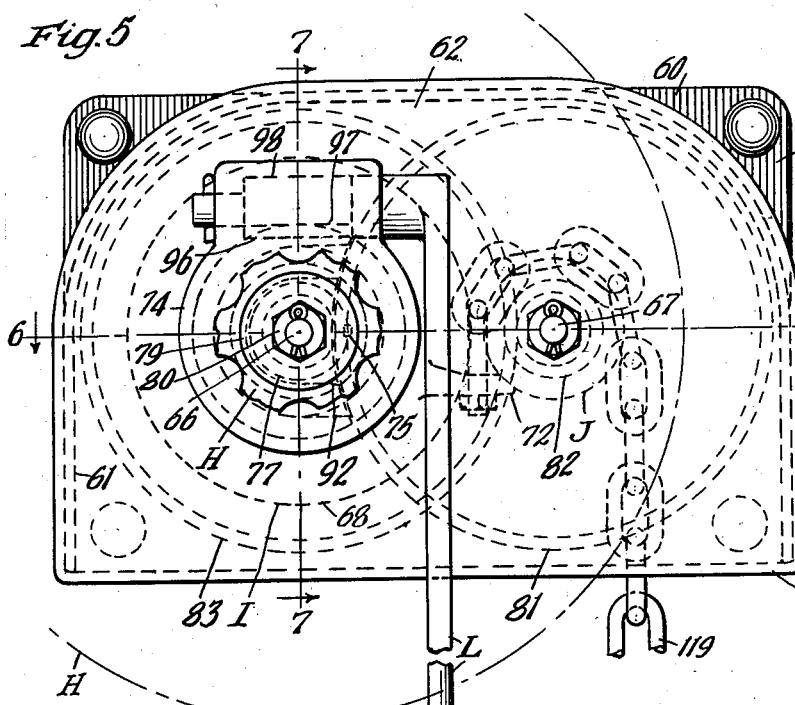
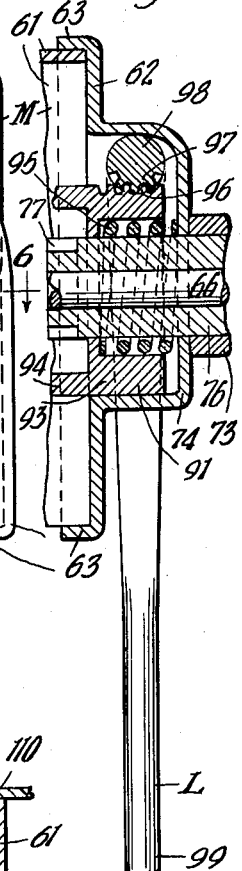
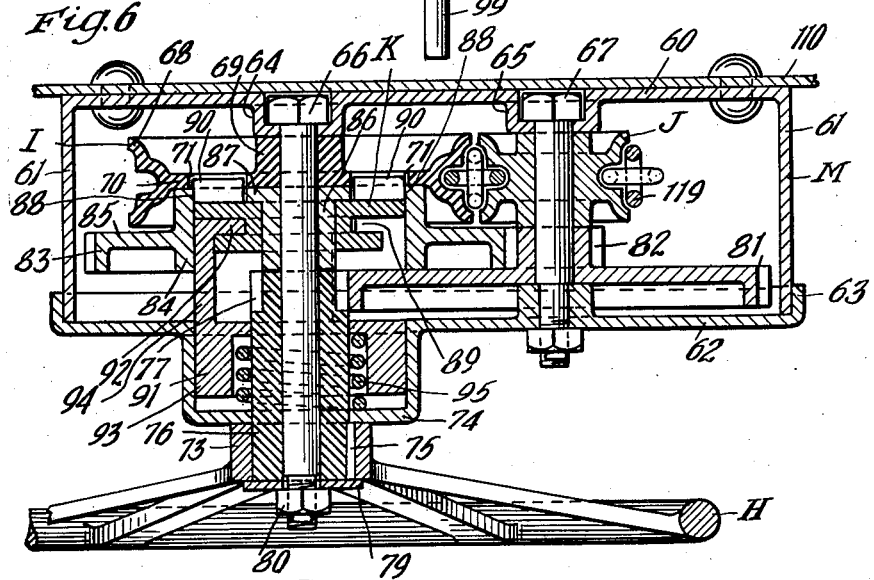
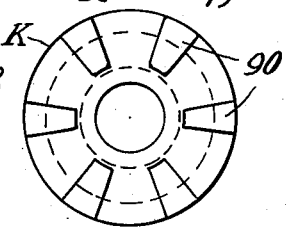
Inventor
John F. O'Connor
By Joseph Harris
His Atty.

Patented Mar. 12, 1935

1,993,977

UNITED STATES PATENT OFFICE 1,993,977

HAND BRAKE

John F. O'Connor, Chicago, Ill.

Application May 12, 1933, Serial No. 670,740

3 Claims. (Cl. 74—505)

This invention relates to improvements in hand brake and more particularly but not exclusively a hand brake adapted for application to freight cars.

One object of the invention is to provide a hand brake having a high leverage ratio between the operating member and the chain winding drum or sheave, the brake being further characterized by the fact that the internal friction of the parts is made in excess of 50% of the power input whereby to render the brake automatically self-locking in any adjusted position.

Another object of the invention is to provide a hand brake of the self-locking or holding type wherein the chain or other tensioning element may be instantly and completely released or disconnected from the operating element proper, such as a hand wheel, so as to leave the latter stationary during the release action.

A still further object of the invention is to provide a hand brake of the chain pull-up type which is particularly adapted for application to the end walls of freight cars; which is of rugged and substantial construction; which consists of few parts adapted to economical manufacture; and which has all of the parts compactly arranged particularly with reference to the distance which the brake projects outwardly from the wall.

Other objects of the invention will more clearly appear from the description and claims hereinafter following.

In the drawings forming a part of this specification, Figure 1 is a front elevational view of a hand brake having the improvements incorporated therein, part of the hand wheel being broken away to better accommodate the figure on the sheet. Figure 2 is a vertical, sectional view corresponding substantially to the line 2—2 of Figure 1. Figure 3 is a vertical, sectional view corresponding substantially to the broken line 3—3 of Figure 2. Figure 4 is an enlarged detailed sectional view corresponding to the line 4—4 of Figure 2. Figure 5 is a front elevational view of another hand brake embodying the improvements, the hand wheel thereof being indicated in dotted lines only. Figure 6 is a horizontal sectional view corresponding to the line 6—6 of Figure 5. Figure 7 is a detailed vertical sectional view corresponding to the line 7—7 of Figure 5. And Figure 8 is an elevational view of a clutch member employed in the structure of Figures 5 and 6.

In carrying out the invention in the embodiment illustrated in Figures 1 to 4, both inclusive, the hand brake is shown applied to a sheet metal end wall 10 of a freight car, the brake proper comprising, broadly, an operating wheel A; a housing B; a chain winding sheave or drum C; a gear D; an eccentric E; a retainer plate F; and a release lever G.

The housing B preferably comprises an inner main shell or casing 11 of cylindrical form, having an integral back wall 12, said shell being riveted to the vertical car end wall 10 by a plurality of rivets 13 passing through suitable lugs or ears 14 cast integrally with the shell, and through the end wall. The housing B is completed by a cover or cap plate 15 also of cylindrical form with a flange 16, the latter telescoping over the annular wall of the shell 11 so as to form a weather-protected interior chamber for the operating parts. At the bottom, the housing is suitably apertured as indicated at 17 to accommodate the projecting handle of the release lever G and, at one side, the shell 11 is provided with an integrally formed depending guide formation 18 for the pull-up chain 19. At its center, the back wall 12 of the housing shell is provided with an outwardly offset hollow boss 20 of non-circular form over which is seated and non-rotatably associated therewith, a spindle 21 having an inner enlarged circular bearing section 22 and an outer longer bearing section 23 of smaller diameter, for the purpose hereinafter described.

The eccentric E is provided with an outer sleeve 24 rotatable on the bearing section 23 of the spindle and with an inner eccentric bearing section 25. The eccentric E, which extends outwardly of the housing and has bearing in a bearing flange 26 of the cap plate 15, is keyed to the hand wheel A as indicated at 27 so that, upon rotation of the hand wheel, the eccentric E will be simultaneously and correspondingly rotated. The hub 28 of the hand wheel has an outer counter bore 29 within which is received a washer 30 and nut 31, the latter cooperating with a through bolt 32, the head of which is seated within said hollow boss 20 and by which the parts are maintained in assembled relation.

The sheave wheel or drum C is provided with a rim 33 of suitable contour to receive and seat the links of the chain 19, as best shown by the cross section thereof in Figure 2, and, at one point in its periphery is provided with an integral chain attaching lug 34, the normal position of which when the brakes are released, is as shown in Figure 3. To insure the sheave wheel always returning and being stopped at the position shown in Figure 3, when the brake is released, the shell 11 of the housing is provided with a radially inwardly projecting integral stop lug 35 in the path of a lug 135 formed integral with the sheave wheel C in line with the lug 34 thereof. The sheave wheel C is further provided with a main web 36 on its inner side adjacent the back wall of the housing and an integral bearing sleeve 37 which rotates upon the inner bearing section 22 of the spindle, as clearly shown. Said bearing sleeve 37, as shown in Figure 2, is disposed within the eccentric section 25 of the eccentric E. The sheave wheel C is further provided, on the inside of the rim, with an integral internal gear 38 with which cooperates the gear D, as hereinafter explained.

Said gear D, which is of lesser external diameter than that of the internal gear 38 and comprised of a slightly lesser number of teeth 39 than the internal gear 38, is formed with a hub 40 rotatable on the eccentric bearing section 25. Said hub 40 is integrally connected with the gear rim by a radial web 41 and the latter is provided on its outer face with a circular series of alternated recesses and ribs 42 so as to provide an annular face ratchet for the purpose hereinafter described.

The plate F is in the form of an annular flat ring, the central opening of which is such as to rotatably fit the eccentric section 25 and of such over-all outside diameter as to approximate the outer diameter of the gear D. At its upper portion, the plate F is provided with a pair of spaced ears 43—43 on its outer side between and to which is pivotally connected the ear 44 of the upper end of the release lever G, as by means of the hinge rivet 45. At its bottom, the plate F is also provided with a spaced pair of outwardly extending lugs 46—46 between which is received the handle end 47 of the release lever, the latter being restrained by said lugs 46 from moving angularly with respect to the plate F but adapted to be swung in and out with reference thereto, as clear from Figures 2 and 4. To prevent the plate F from rotating but at the same time to permit it to shift bodily in consonance with the rotation of the eccentric E on which it is mounted, the cap plate of the housing is provided with an inwardly extending pair of ears or lugs 48—48 alongside and overlapping the lugs 46. The inner faces of the lugs 48 are preferably somewhat rounded, as indicated at 49, and spaced apart a distance slightly greater than the over-all distance between the outer faces of the lugs 46 so as to accommodate the bodily and slight angular movements of the plate F when the latter is shifted as hereinafter described.

The release lever G, pivoted to the plate F as hereinbefore described, is formed with an annular ring section 50 between the pivot lug 46 and the handle section 47, said ring section 50 having a central opening sufficiently enlarged to at all times clear the bearing flange 26 of the cap plate 15. Below the spindle, the release lever 47 is provided with one or more inwardly projecting teeth 51 which are entered through suitable correspondingly located openings 52 in the plate F and are adapted to engage with the radial ratchet teeth 42 of the gear D, as shown best in Figure 4. To normally maintain engagement of said teeth 51 with the ratchet teeth 52, the release lever is provided with an integral centering lug 53 on which is seated a coil spring 54, the other end of said spring being seated in a suitable outwardly extended hollow boss 55 formed integral with the cap plate 15.

The operation of the brake is as follows, assuming the brake in full release as shown in the drawings. The hand wheel A is rotated clockwise, which obviously will impart a simultaneous and equal rotation to the eccentric E. Obviously as the eccentric E is rotated, the true center of mesh of the two gears 39 and 38 will travel around in a well known manner and, due to the difference in number of teeth on the gear D and internal gear 38 of the sheave wheel, the eccentric movement thus imparted to the gear D will induce a differential movement between the gear D and sheave wheel C and an advance of the sheave wheel in an amount corresponding to the difference in number of teeth of the two meshing gears which, in actual practice, will preferably be three or four teeth. The gear wheel D, however, is prevented from rotation due to the fact that it is interlocked with the release lever G, which in turn is interlocked with the plate F and the latter prevented from rotation by the stationary or fixed lugs 49—49 of the housing. In actual practice, the hand wheel A may be spun during the initial stages of the take-up of the slack in the chain and until such time as the chain becomes taut. Furthermore, due to the arrangement described, the internal friction will be such as to slightly exceed 50% of the power input to the wheel A and hence, regardless of the tension or load that may ultimately be exerted by the chain 19, the parts remain automatically self-locked in any adjusted position. Furthermore, it is apparent that the leverage ratio between the hand wheel and the sheave wheel is exceedingly high, said ratio being primarily dependent upon the difference in number of teeth of the two meshing gears 38 and 39 and the differences in diameters of the hand wheel gear D and sheave wheel C. In actual practice, for hand brakes of freight cars, a maximum force exerted by the brakeman using one hand on a hand wheel positioned as shown and using his other hand to steady himself, is generally assumed to be about one hundred twenty-five pounds and the desired maximum tension to be placed on the chain is generally assumed to be thirty nine hundred and fifty pounds. The leverage ratio and internal friction are made such that the power input (applied force times distance through which moved) on the hand wheel, will somewhat exceed twice that of the effective load (ultimate tension on the brake chain times distance through which moved on the sheave wheel), the difference between the latter amount and the power input being that absorbed by the internal friction of the parts.

To release the brake chain and at the same time prevent spinning of the hand wheel, the release lever G has its lower end pulled outwardly, thus disengaging the teeth 51 from the annular ratchet 42. This immediately serves to free the gear D so that it may then rotate freely on the eccentric bearing section 25 as the sheave wheel C is rotated in a counter-clockwise direction under the tension of the brake chain. In actual practice, the diameter of the sheave wheel C will be made such that only about 270° of rotation thereof will be required to take up any usual amount of slack and apply the brakes to the desired degree and should there be an unusual or excessive amount of slack, approximately 90° additional rotation of the sheave wheel is available if necessary. By providing the stop lugs 35 and 135 as shown in Figure 3, assurance is had that, at the beginning of every application of the brakes, the maximum speed of take-up will always occur since the brake chain is always tangent to the sheave at the starting of the winding operation. As soon as release has been effected, the brakeman then releases his grip on the release lever G and the latter is forced back to its operative engagement with the gear D under the influence of the spring 54, as will be apparent.

Referring next to the form of the invention illustrated in Figures 5 to 8 inclusive, the brake therein shown comprises, broadly, a housing M; a hand wheel H; a chain winding sheave or drum I; an idler sheave J; reduction gearing hereinafter more particularly described; a clutch member K; and a release lever L.

The housing M, as shown, preferably comprises a main shell or casing having a back wall 60 riveted to the car wall 110 and an outstanding flange 61 having vertical ends and a generally curved top, as best shown in Figure 5. A cap plate 62 is also employed having a straight horizontal bottom edge and conformed in contour to the flange 61 of the shell and provided with a flange 63 adapted to telescope over said flange 61, thus leaving the bottom of the housing open. The back wall 60 is provided with two inwardly extended hollow and non-circular bosses 64 and 65 for the reception of the heads of the two retainer bolts 66 and 67, the bolts being held from rotation by said bosses, as will be understood.

The main sheave wheel I is provided with a rim 68 of suitable cross section to receive the links, as shown, and with a hub 69 rotatable on the shank of the bolt 66, said hub being connected to the rim by a web 70 having a plurality of radially disposed openings or slots 71—71 therein for the purpose hereinafter described.

The idler sheave J, of materially smaller diameter than the sheave I, is losely or freely rotatably mounted on the shank of the bolt 67 and has its periphery likewise formed to receive the links of the pull up chain 119, which is passed over the idler J and has its end secured to a lug 72 formed integral with the sheave I. As clearly shown in Figure 5, the lug 72 is so disposed that, under full release, said lug engages with the idler J and limits the unwinding or counter-clockwise rotation of the sheave J so as to insure starting of the rotation of the latter in a winding direction always at the same point.

The hand wheel H is provided with a hub 73 seated against the outer wall of a hollow boss 74 formed integrally with and projecting outwardly from the cap plate 62. Secured to the hub 73 as by key 75 is a hollow member having an outer bearing section 76 and an integral driving gear 77, said member being rotatable on the bolt 66 and within a suitable opening provided in the cap plate as shown. To hold the parts in assembled relation, a washer 79 is applied over the end of said member and retained in place by the nut 80 threaded onto the reduced threaded end of the bolt.

The driving gear 77 is in mesh with a larger diameter intermediate gear 81 rotatable on the other bolt 67, said gear 81 having preferably formed integral therewith a smaller gear 82 which in turn meshes with and drives the final gear of the train 83. The latter is formed with a special bearing section 84 connected to the gear rim proper by a web 85 and to the hub 86 by another and inwardly offset web 87, the latter being provided with a plurality of radially disposed slots or openings 88 adapted to aline with the openings 71 of the sheave I. As clear from Figure 6, the bearing section 84 of the gear 83 bears against the web 70 of the sheave I and is adapted to be normally interlocked or clutched to the latter by the clutch member K. Said clutch member K is in the form of a ring of substantially channel cross section, thus providing an annular groove 89, the inner wall of the clutch member K being provided with a plurality of radially arranged teeth or lugs 90—90 movably mounted in the slots 88 of the gear wheel 83 and adapted to enter the slots 71 of the sheave I, as shown. Said clutch member K is rotatably and slidably mounted in the bearing section 84 and on the hub 86 of the gear 83 and is adapted to be retracted or withdrawn from operative clutch engagement with the sheave I, by a shipper member 91. The latter is provided at its inner end with an arcuate flange 92 engaging within the annular slot 89, said flange 92 being connected to the outer thickened end 93 by an arcuate flange 94 and on which the bearing section 84 of the gear 83 is adapted to have bearing. The outer end 93 of said shipper member is slidably but non-rotatively mounted within the hollow boss 74 of the cap plate and is normally pressed inwardly so as to maintain the clutch relation by a coil spring 95 surrounding the bearing section 76, and seated within a suitable annular recess in said section 93. As obvious, the inner end of said spring bears against the member 91 and the outer end against the cap plate.

At its upper side, the shipper member 91 is provided with a short rack 96 with which co-operates a segmental gear 97 carried by a short, horizontally extending shaft 98 mounted in suitable bearings formed in the boss 74, said shaft 98 having secured to its right hand end, as viewed in Figure 5, the release lever L which normally hangs downwardly behind the hand wheel H and which is extended appreciably below the latter so as to provide a hand grip 99 that may be readily grasped by the brakeman.

The operation is as follows, assuming the parts in full release, as shown in the drawings. As the hand wheel H is turned clockwise, the gear 77 induces counter-clockwise rotation of the gears 81 and 82. The latter being in mesh with the gear 83, produces a clockwise rotation of the latter and inasmuch as the same is interlocked or clutched to the sheave I, the latter is caused to likewise rotate in a clockwise direction. Obviously, with the several gears arranged as shown, the leverage ratio between the hand wheel and the sheave I is greatly multiplied with corresponding reduction of speed of rotation. As the sheave I is rotated, the chain is wound thereon, the chain passing up and over the idler sheave J. During this action, as will be apparent, the clutch member K rotates in unison with the gear 83 and sheave I. During the take-up of the chain and application of the tension to the brakes, internal friction occurs in various places in the driving mechanism as, for instance, between the gear bearing member 76—77 and bolt 66, between the several sets of meshing gear teeth, between the gear 81—82 and the bolt 67, between the sheaves I and J and the respective bolts on which rotated, and between the gear 83 and the bolt 66 and bearing section 94 of the shipper member. In actual practice, the gear ratio and the internal friction will be made such that, as in the first described form, more than 50% of the power imput will be absorbed by the internal friction so as to render the parts self-locking in any adjusted position, regardless of the tension which may ultimately be applied to the brake chain. To effect release, the release lever L is pulled outwardly or to the right, as viewed in Figure 7, thereby shifting the shipper member 91 outwardly and pulling the clutch member K so as to disengage its teeth from the sheave I and thus allowing the latter to rotate freely in an unwinding direction under the tension of the brake chain and obviously reducing the internal friction below 50% and leaving all of the driving mechanism as well as the hand wheel stationary during the release action. As heretofore explained, the sheave I will come to rest in the position best shown in Figure 5 where the lug 72 engages the idler sheave J, whereupon the release lever L is released by the brakeman, said lever then returning to normal position as well as the clutch member K. In this latter connection, attention is directed to the fact that the weight of the lever L is such as to assist the spring 95 in effecting automatic return of the parts to clutch engaging relation.

From the preceding description, taken in connection with the drawings, it will be seen that the chain winding sheave and hand wheel in both constructions, rotate about the same axis; that in both constructions, a clutch-like arrangement is incorporated in the driving gearing between the hand wheel and chain winding sheave, which clutch arrangement may be released so as to permit the chain winding sheave to rotate in an unwinding direction freely and relieved of the greater part of the internal friction; and that there is ample clearance between the rim of the hand wheel and the housing and wall of the car so as to prevent possibility of injury to the hands of the brakeman. Furthermore, as will be obvious, all of the main parts may be readily manufactured in the form of castings at comparatively small expense and there are no delicate parts likely to become broken or to get out of order.

Although the preferred manner of carrying out the invention has herein been shown and described, the same is merely illustrative and all changes and modifications are contemplated that come within the scope of the claims appended hereto.

What is claimed is:

1. In a hand brake, the combination with a housing; of a chain winding drum rotatably mounted within the housing; a driving gear in mesh with said drum also disposed within the housing; a hand wheel; eccentric means interposed between said hand wheel and driving gear for eccentrically shifting the latter; a retainer plate within the housing and substantially axially aligned with the driving gear; means preventing rotation of said retainer plate; and a spring governed release lever mounted on said plate and normally having interlocking engagement with said driving gear.

2. In a hand brake, the combination with a substantially cylindrical housing adapted to be secured to a vertical car wall; of a fixed spindle within and extending substantially axially of the housing; a drum rotatably mounted on said spindle within the housing and having a peripheral chain winding rim and an interior gear; a driving gear in mesh with said drum gear and housed within the rim of the latter; an eccentric rotatable about said spindle and disposed within said driving gear whereby the eccentric, driving gear and winding rim of the drum are compactly assembled; manually operable means exterior of the housing for effecting rotation of the eccentric; a retainer plate supported by said eccentric and with respect to which the eccentric is rotatable; a release lever mounted on said plate within the housing and normally interlocked through the plate with said driving gear, said lever having a portion thereof extended outside of the housing for effecting release of the driving gear.

3. In a hand brake, the combination with a housing having a bearing spindle; of a chain winding drum rotatably mounted on said spindle within the housing and having an internal annular gear; a wheel having a peripheral gear housed within and meshing with said internal gear; an eccentric bearing on which said last named gear wheel is mounted; means exterior of the housing for rotating said eccentric; a release lever pivotally supported within the housing, the pivotal axis of the release lever extending parallel to the plane of the gear wheel and the lever normally having direct and operative engagement therewith, said release lever being shiftable in consonance with the eccentric shifting of the gear wheel; and means on the interior of the housing preventing rotative movement of the release lever.

JOHN F. O'CONNOR.